UNITED STATES PATENT OFFICE.

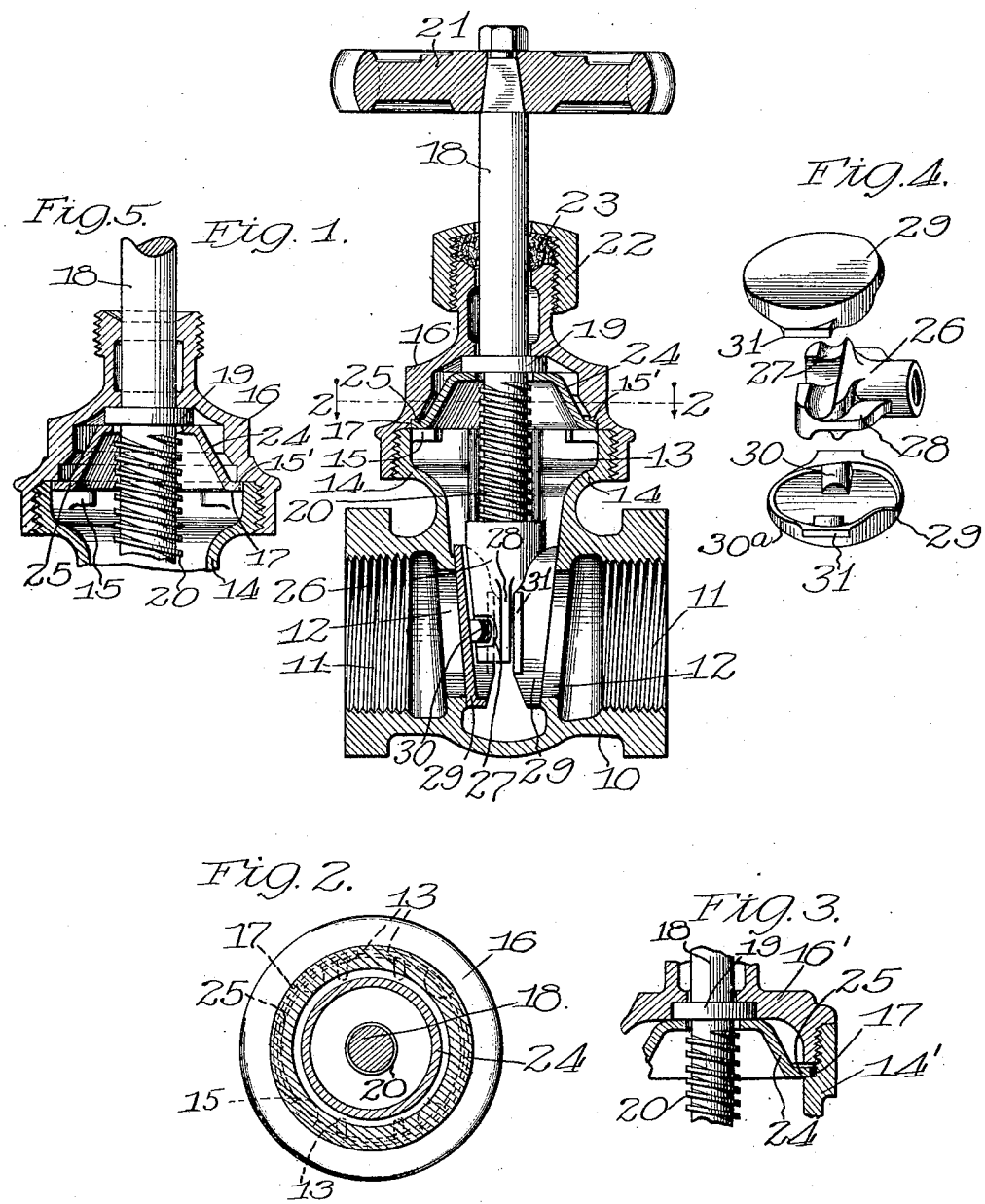

CLETUS N. ALLERDING, OF MANSFIELD, OHIO, ASSIGNOR TO THE OHIO BRASS COMPANY, OF MANSFIELD, OHIO, A CORPORATION OF NEW JERSEY.

VALVE.

1,138,721.      Specification of Letters Patent.      Patented May 11, 1915.

Application filed August 26, 1911. Serial No. 646,113.

*To all whom it may concern:*

Be it known that I, CLETUS N. ALLERDING, a citizen of the United States, residing at Mansfield, in the county of Richland and State of Ohio, have invented certain new and useful Improvements in Valves, of which the following is a specification.

This invention relates more particularly to that class of valves known as gate valves, and one of the principal objects of the invention is to provide an improved construction, combination and arrangement of the several parts which will be simple in construction and effective and efficient in operation.

A further object of the invention is to provide a valve of this class with improved means for effecting the operation of the valve disks without moving the valve stem longitudinally.

A still further object of the invention is to provide valve disks of an improved form and construction which adapt themselves to the valve seats.

For the attainment of these ends, and the accomplishment of other new and useful objects, as will appear, this invention consists in the features of novelty in the construction, combination and arrangement of the several parts generally shown in the accompanying drawing and described in the specification, but more particularly pointed out in the appended claims.

In the drawing Figure 1 is a cross sectional view showing the preferred form of a valve constructed in accordance with the principles of my invention; Fig. 2 is a cross sectional view on the line 2—2 of Fig. 1; Fig. 3 shows a modification of the threaded connection between the valve housing and the valve bonnet; Fig. 4 is a perspective view of the valve carrier and disks; Fig. 5 is a detail sectional view of a modified construction and arrangement.

It is frequently desired to employ a gate valve in which the valve disks are positioned by means of the rotation of a valve stem in which the movement of the valve disks is not produced by a corresponding movement of the stem. In other words, while the stem is rotated it is not moved longitudinally.

The present invention has for its principal object to provide an improved construction whereby this result may be attained.

A further object of the invention is to provide means whereby the valve disks may be slightly oscillated about their points of support to position them with respect to the valve seats.

Referring now more particularly to the drawing, a valve housing 10 is formed with threaded openings 11 and valve seats 12. These valve seats 12 are inclined slightly toward the bottom of the housing, and at the sides thereof are guide ways 13 substantially parallel with the vertical axis of the housing. The upper portion of the housing is formed with a threaded portion 14 adjacent the top edge of which there are inwardly projecting lugs 15. A bonnet 16 is adapted to fit over the threaded portion of the housing, one of the members being threaded within the other, and providing an opening or annular space 17 between the inwardly projecting lugs 15 and the shoulder 15' when the bonnet is screwed upon the housing 14. A valve stem 18, formed with a shoulder 19 and threaded portion 20, is adapted to be inserted within the bonnet and the housing, the shoulder 19 bearing against the inside of the bonnet, and resting upon the stem retainer 24. At the top of the stem 18 is a hand wheel 21, secured thereto in any well known manner, and surrounding the top of the bonnet is a packing nut 22, which presses packing 23 against the bonnet and around the valve stem, forming a tight connection.

A stem retainer 24, formed of any desired or suitable material, such as metal, is adapted to be inserted within the bonnet 16, and rests upon the lugs 15 and against the shoulder 19. This retainer 24 in the present exemplification of my invention is preferably dish-shaped in form, but may be of any desired shape, with an opening in the top through which the threaded portion of the stem extends, the edges of the opening forming an interior flange bearing against the lower face of the shoulder 19, and the outer edges of the retainer being formed into an exterior flange 25, which is adapted to be received in the space 17 formed with the union of the housing and the bonnet, and supported by the projecting lugs or ears 15.

Threaded upon the lower end of stem 18 is a disk carrier 26. The disk carrier 26 is formed near the lower end with recesses 27 on opposite sides thereof. The recesses having concaved bottom surfaces which are curved laterally, are adapted to receive and support the valve disks 29, which are formed preferably with a flat outer face and hollowed out on the opposite side. The hollowed out portion is formed by an annular flange 30ª to provide necessary strength. Extending inwardly from the annular flange 30ª are projections 30 having convex faces curved laterally to seat in the disk recesses 27 of the carrier, to permit an oscillatory movement of the disk about the carrier, whereby the disks are positioned with respect to the valve seats 12. At the sides of the valve disks and projecting therefrom are ears 31, which are adapted to engage the guide ways 13 in the housing, and to position the valve disks with respect to the valve seats.

In the exemplification of my invention shown in Fig. 1, it will be seen that the bonnet 16 is positioned over the threaded portion of the housing 10, the stem retainer 24 being supported above the threads which connect the two members.

It is also contemplated that the members may be positioned as shown in Fig. 3, in which the bonnet 16' is threaded within the threaded portion 14' of the housing, the retainer 24 being held in position between the two members at the bottom of the threaded portion. In either construction it will be noted that the retainer 24 is freely supported in the annular space 17, but its movement in a direction longitudinal of the valve stem is limited so that the stem is free to rotate and is positively held in against longitudinal movement.

It is also contemplated that the members may be positioned as shown in Fig. 5, in which a bonnet 16 is adapted to fit over the threaded portion of the housing 14. The inwardly projecting lugs 15 being positioned below the upper face of the housing 14 to form a bearing entirely inside the housing for the stem retainer 24. The lower interior shoulder 15' of the bonnet extends across the flange 25 of the retainer.

It is evident that as the stem is rotated the disk carrier is moved upon the threaded portion of this stem, causing the valve disks to be moved in accordance therewith. Furthermore, the disks being mounted so that they oscillate slightly about the carrier, easily adjust themselves to a variation of the angle of the valve seats, and the valve disks being alike, the cost of production is correspondingly lower.

While I have thus particularly described the preferred construction, combination and arrangement of the several parts which constitute my invention, it is evident that those skilled in the arts to which this appertains may make various changes therein without departing from the spirit and scope of my invention.

What I claim is:

1. In a gate valve, the combination with a housing and a bonnet therefor, threaded one within the other and forming an annular space on the inside when so positioned, a stem rotatable in the housing having a shoulder, one face of which bears against the inside of the bonnet, the lower end of the stem being threaded, a stem retainer surrounding the stem with an outer edge which engages loosely in the said annular space, and an inner edge which engages the other face of the said shoulder, a disk carrying nut positioned on the stem, the housing being formed with valve seats which incline as they approach the bottom and with guide ways substantially parallel to the axis of the valve, disks with one flat face, ears which project from opposite sides and are adapted to engage the guide rails, and hollowed out on the other side with rounding projections therein, the said disk carrying nut being formed at the end and on opposite sides with grooves to contain the said rounding projections whereby the disks are moved up and down on the valve seats and permitting them to oscillate about the disk carrying nut, the said retainer being operative to prevent the movement of the stem in a longitudinal direction, and the said disk carrying nut being held against rotation whereby the disks are moved when the stem is rotated.

2. In a gate valve, the combination with the valve housing and a bonnet threaded one within the other, of a valve stem, means to prevent the longitudinal movement of the stem, a disk carrier threaded on the valve stem and formed at the end with a head grooved on both sides, valve disks with one flat face, hollowed out on the opposite side and provided with rounding projections, which fit the grooved portion of the disk carrier, whereby the disks are permitted to have an oscillatory movement about the carrier to seat them upon the valve seats, the said grooves and projections being effective to cause the engagement of their members to raise and lower the disks when the said stem is rotated without moving the latter longitudinally.

3. In a valve of the class described, the combination of a valve disk carrier formed with lateral transverse grooves convexly arched from a central opening, and valve disks formed with lateral rounded projections concavely arched spaced apart and fitting the said grooves to position the disks on the carrier.

4. In a gate valve, the combination with a valve housing and a bonnet threaded one within the other, of a valve stem, means to prevent the longitudinal movement of the stem, a disk carrier threaded on the valve stem and formed with lateral transverse grooves convexly arched from a central opening, and valve disks formed with laterally rounded projections concavely arched, spaced apart, and fitting the grooves to position the disks.

5. In a gate valve, the combination with a housing and a bonnet therefor threaded one within the other and forming an annular retaining space, a rotatable valve stem having a shoulder bearing one face against the inside of the bonnet, a stem retainer through which the stem is passed having an edge held by the housing and bonnet in the annular retaining space with another edge bearing against the opposite face of the shoulder to hold the stem against longitudinal movement, a valve disk carrier threaded on the valve stem and formed with lateral transverse grooves convexly arched from a central opening, and valve disks formed with laterally rounded projections concavely arched, spaced apart, and fitting the said grooves to position the disks on the carrier.

In testimony whereof I have signed my name to this specification, in the presence of two subscribing witnesses, on this 23 day of August A. D. 1911.

CLETUS N. ALLERDING.

Witnesses:
J. C. PAINTER,
C. V. MARKS.

Copies of this patent may be obtained for five cents each, by addressing the "Commissioner of Patents, Washington, D. C."